United States Patent
Isaksson et al.

(10) Patent No.: US 7,063,488 B2
(45) Date of Patent: Jun. 20, 2006

(54) PIN LOCK SYSTEM FOR CUTTING INSERT HAVING A BLIND HOLE

(75) Inventors: Robert Isaksson, Järbo (SE); Yusuke Seto, Kobe (JP)

(73) Assignee: Sandvik Intellectual Property AB, Sandviken (SE)

(*) Notice: Subject to any disclaimer, the term of this patent is extended or adjusted under 35 U.S.C. 154(b) by 314 days.

(21) Appl. No.: 10/257,259

(22) PCT Filed: Apr. 9, 2001

(86) PCT No.: PCT/SE01/00794

§ 371 (c)(1),
(2), (4) Date: Jan. 3, 2003

(87) PCT Pub. No.: WO01/78927

PCT Pub. Date: Oct. 25, 2001

(65) Prior Publication Data

US 2004/0101373 A1    May 27, 2004

(30) Foreign Application Priority Data

Apr. 14, 2000   (SE) .................................. 0001418-3

(51) Int. Cl.
*B23P 15/34*    (2006.01)
(52) U.S. Cl. ......................... 407/113; 407/95; 407/108
(58) Field of Classification Search ................ 407/95, 407/105, 113, 108, 82, 66
See application file for complete search history.

(56) References Cited

U.S. PATENT DOCUMENTS

| 3,289,272 A | * | 12/1966 | Stier | ......................... 407/104 |
| 3,807,007 A | | 4/1974 | Lindskog | |
| 3,908,255 A | | 9/1975 | Faber | |
| 3,965,553 A | * | 6/1976 | Faber | ......................... 407/104 |
| 4,890,961 A | * | 1/1990 | Carl et al. | ................... 407/105 |
| 6,290,436 B1 | * | 9/2001 | Qvarth | ....................... 407/113 |
| 6,582,162 B1 | * | 6/2003 | Shiraiwa | ..................... 407/101 |
| 6,773,210 B1 | * | 8/2004 | Erickson | ..................... 407/102 |

FOREIGN PATENT DOCUMENTS

| CH | 488 513 | 5/1970 |
| EP | 0 450 542 | 10/1991 |

* cited by examiner

*Primary Examiner*—Willmon Fridie, Jr.
(74) *Attorney, Agent, or Firm*—Drinker Biddle & Reath LLP

(57) ABSTRACT

In an insert holder for indexable cutting inserts, a clamping device is located which includes an L-shaped member having first and second arms. The first arm is received in a blind hole in the cutting insert and the second arm is actuated by a pressure screw. A free end portion of the second arm has a yoke received in a recessed annular waist portion of the screw so that movement of the screw causes the L-shaped member to rotate and push the insert downwardly against a base surface and laterally against an upright support surface. The insert has a central elevated plateau on its top side to enable a depth of the blind hole to be maximized.

13 Claims, 3 Drawing Sheets

PIN LOCK SYSTEM FOR CUTTING INSERT HAVING A BLIND HOLE

BACKGROUND OF THE INVENTION

The present invention relates to a new type of cutting tool, including an insert holder for clamping an indexable cutting insert provided with a cavity in a cutting seat in the holder body, so that the cutting insert rests against a base surface, a locking pin, fixed in a bore in the holder and extending up in the bore of the cutting insert, being arranged to ensure a stable location of the cutting insert for clamping the cutting insert against at least one lateral support in the cutting seat.

Many different insert holders of the pin type are known, in which clamping of the cutting insert is provided by means of a pin extending up into a hole in the cutting insert, the lever movement of the pin being provided by the opposite end of the pin cooperating with a pressure generating member placed in the holder. The Swedish Patent 357 316 (corresponding U.S. Pat. No. 3,807,007) shows an example of such an insert holder of the pin type. However, with this type of holder, unfavorable positional changes of the cutting insert during the machining operations in progress have sometimes been noted.

Furthermore, it is previously known from, for instance, the Swedish patent specification 368 786 (corresponding U.S. Pat. No. 3,908,255) a pin holder, where a locking pin, fixed in a bore in the insert holder and extending up in a hole in the cutting insert, is arranged to cooperate with a pressure member placed in the insert holder for clamping the cutting insert against at least one lateral support in the cutting seat. However, this type of holder having a built-in toggle joint for engagement with the insert hole is only thought to work together with the type of cutting inserts having a central through hole extending up through the entire cutting insert. Furthermore, this is a necessity with the solution given in said patent SE-368 786 since there it is assumed that the L-shaped arm cooperating with the cutting insert should also have a side projection which is arrange to be able to push the cutting insert from above, downwards against the shim thereof. This type of holder has, however, the disadvantage that it is necessary that the cutting insert has a central through hole. Characteristic for this type of cutting insert is a major risk of breakage of the cutting insert, especially if they are made of mixed ceramics or pure ceramics, which are cutting materials, which are used more and more. Another disadvantage with this type of insert holder is that as the machining operation progresses, dirt and particles fall down in the central insert hole and gather in the bottom of the cavity, which receives the looking device formed as a toggle joint. Occasionally, even difficulties with releasing the cutting insert during insert changing may occur.

The purpose of the invention is now to provide a new and improved type of tool, which is not impaired by the above-mentioned inconveniences. According to the invention, it is proposed that an insert holder be equipped with a hole, which does not pass through the cutting insert, in which hole a substantially L-shaped support pin is received. At the same time, a bore is formed in the holder in which a pressure member is arranged, e.g., by a threaded connection. The pressure member possesses a recessed waist portion for cooperation with a yoke formed on a leg of the support pin. When the pressure member is rotated, on the one hand, a downward force on one arm of the support pin is generated, which causes the cutting insert to be pressed against the bottom surface of the cutting seat, at the same time as a force is generated by the inclination of the support pin which is directed inward towards the holder body, this brings about the clamping of the cutting insert against the lateral support or lateral supports via the support pin.

DESCRIPTION OF THE DRAWINGS

The invention is better understood from the following description and drawings, showing a preferred embodiment according to the invention, where.

Figure 1:
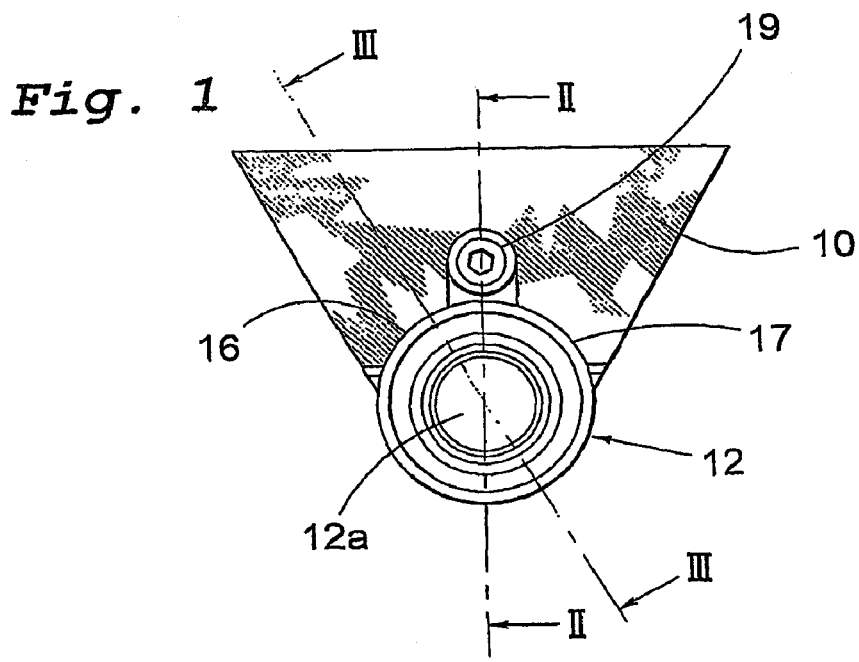
FIG. 1 shows a planar view of the insert holder,
FIG. 2 a section view along the line 11—11 and
FIG. 3 a section view along the line 111—111 in FIG. 1,
FIG. 4 a perspective view of the holder in FIG. 1,
FIG. 5 a perspective view of the cutting insert and the clamping members thereof,
FIG. 6 a planar view of another embodiment,
FIG. 7 a section view along the line V—V in FIG. 6, and
FIG. 8 a detailed enlargement of FIG. 7.
Figure 2:
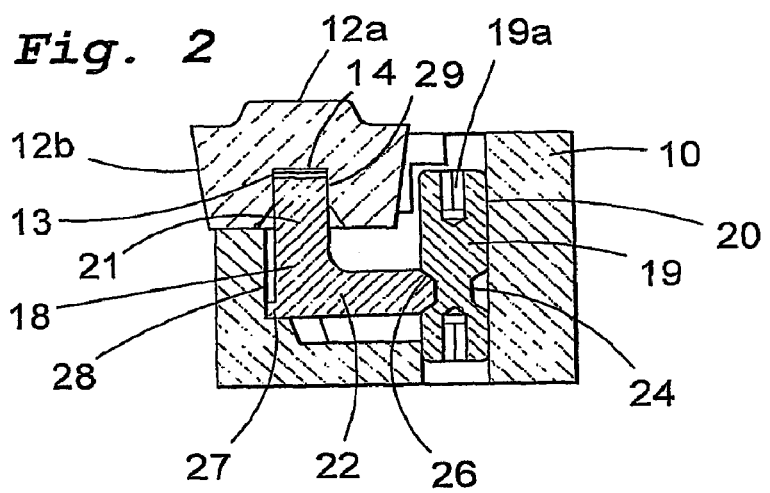
Figure 3:
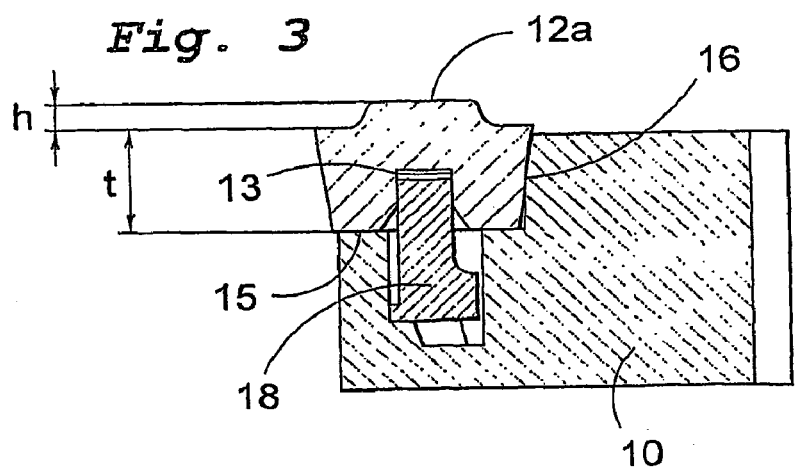
Figure 4:
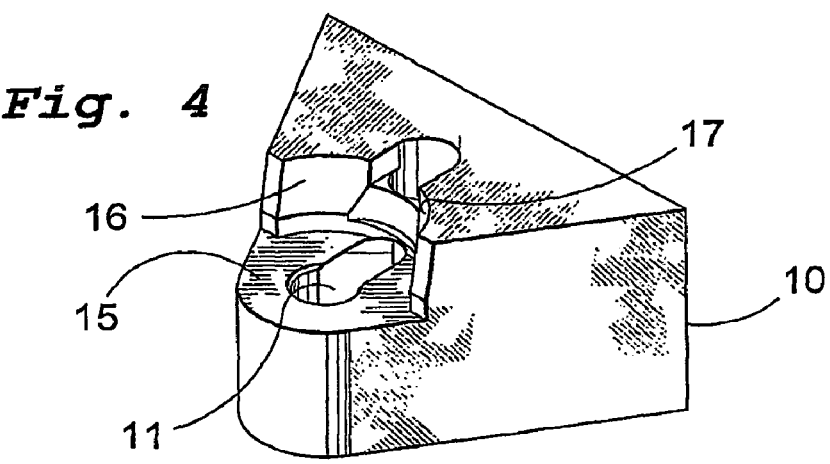

DESCRIPTION OF PREFERRED EMBODIMENTS OF THE INVENTION zn the drawing, an insert holder body is designated 10, which at an end portion has a cutting seat with a bore 11 connected to the bottom thereof. An indexable insert 12, having a central hole 13, that has a bottom 14, is fixed in the cutting seat. The insert seat comprises a base surface 15, which is integrated into the holder or is formed by a detachable shim, which may consist of cemented carbide in order to retain its hardness and flatness. The cutting insert 12 is round with a central elevated plateau 12a. The lateral support of the insert seat is formed by the surfaces 16 and 17, which have a concave bending corresponding to the shape of the cutting insert. The surfaces 16 and 17 have a conical shape corresponding to the flank surface 12b of the cutting insert, the clearance angle of which is normally 4–8°. A support pin 18 is mounted in the bore 13 of the cutting insert, it is intended to act as a double-armed lever under the influence of a pressure member, which here has been given the form of a cylindrical pin 19 threaded into the holder 10 and in that connection has been accommodated in a channel 20 directed downwards towards the bottom of the holder, which channel is directed mainly parallel to the recess 13 in the cutting insert, which receives the support pin 18.

Figure 5:
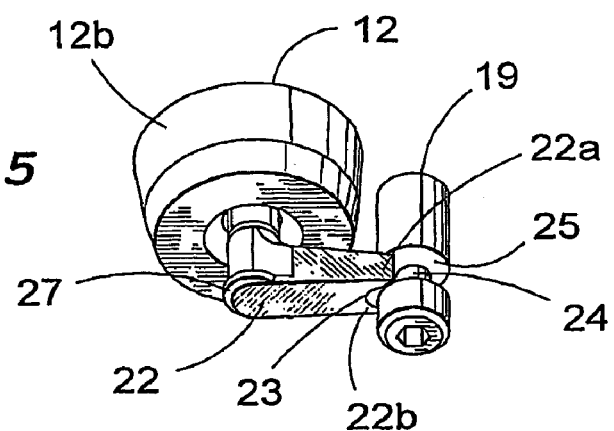

The pin 18 is L-shaped and has a cylindrical portion 21 at one end intended for engagement with the hole wall of the cutting insert, while an arm 22 formed substantially perpendicularly to the portion 21 is arranged to cooperate with the member 19. The two wedge-shaped end portions 22a and 22b of the arm 22 define a yoke, i.e., they form between themselves a V-shaped cavity 23 (see FIG. 5) intended to be received in a recessed annular waist portion in the form of a radial recess 24 developed on the member 19. The ring-shaped upper limiting surface 25 of the recess 24 as well as the upper end surface 26 of the end portions 22a, 22b are beveled, i.e., they have an oblique orientation in relation to the center axis of the bore 20, which receives the member 19. Laterally, the support pin 18 is also provided with a smaller projection 27, which abuts against a surface 28 on the inside of the recess in the holder which receives the support pin 18.

The cutting insert is clamped by tightening the member 19 by bringing a suitable key member (not shown) into engagement with a countersunk key recess 19a on the member 19. The member 19 is pressed downwards so that the surfaces 25 and 26 are brought in contact. Continued tightening of the member 19 has the effect that the arm 22 rotates about the projection 27 as a fulcrum so that the arm 22 slides downwards with the projection 27 in contact with the surface 28. The result is that the cylindrical portion 21 is pressed with force against the inside of the hole 13 in the cutting insert so that the same is effectively clamped laterally. Thanks to the frictional engagement between the portion 21 and the wall of the hole 13 in the contact portion 29 and the depression caused by the member 19, a downward clamping force is also exerted on the cutting insert. The cutting insert is loosened by turning the member 19 around in the opposite direction.

Figure 6:
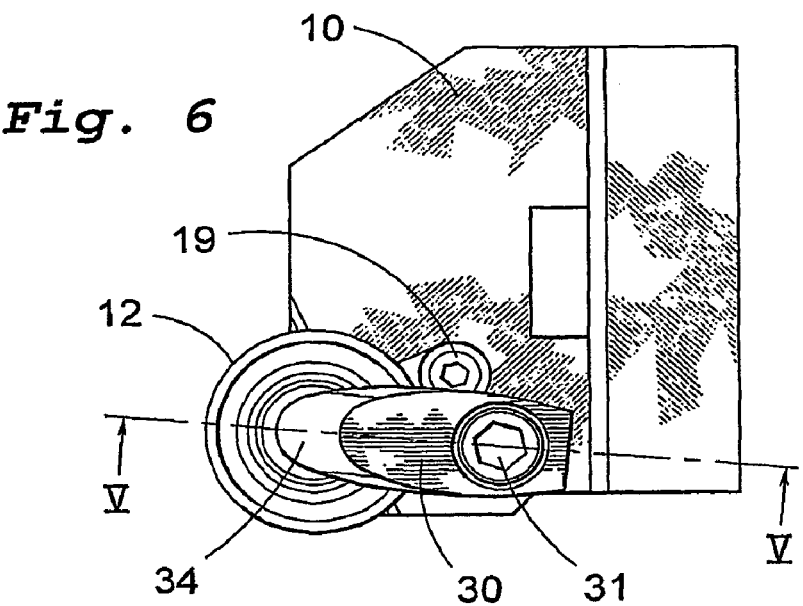
Figure 7:
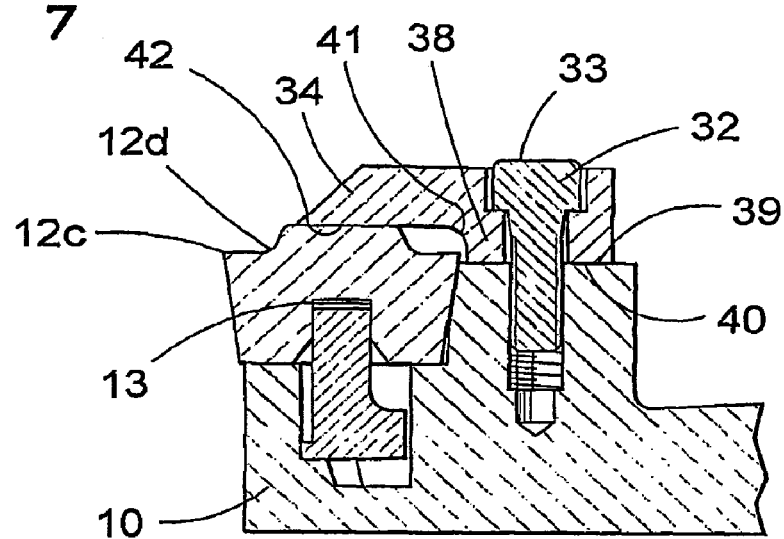

In the alternative embodiment shown in FIGS. 6–7, the same clamping principle as previously shown in FIGS. 1–4 is retained. As a complement, the insert holder has been equipped here with an upper clamp 30, which is arranged to be clamped by means of a tightening screw 31 through the clamp, the head 32 of which substantially countersunk in its entirety in a bottomed recess in the clamp so that the upper surface 33 of the head 32 becomes situated in the main flush with the top surface of the clamp. In this way, chip flow in the rearward direction is facilitated. It is intended that the front part 34 of the clamp 30 should rest, with the bottom side thereof, against the central elevated plateau 12a of the cutting insert. The upper surface of the cutting insert 12 between the plateau 12a and the cutting edge 12c has the character of an outer plane surface, which transforms inwards towards the cutting insert into a concave rounding upwards to a shoulder 12d serving as chip breaker. This part of the cutting insert, from the edge 12c and into the plateau 12a, should, however, be entirely free from surface contact with the clamp 30, as is best seen in FIG. 7. Thanks to the fact that the cutting insert 12 has been formed with a central elevated plateau 12a, it becomes possible to let the depth of the hole 13 extend upwards a distance corresponding to 40–60% of the thickness of the cutting insert without this having a negative effect on the strength of the cutting insert, even in the case where the cutting material consists of pure ceramics or mixed ceramics. Under such circumstances, the height h of the plateau 12a should be chosen such that it amounts to 15–40% of the thickness t of the cutting insert, preferably 20–30% thereof.

Figure 8:
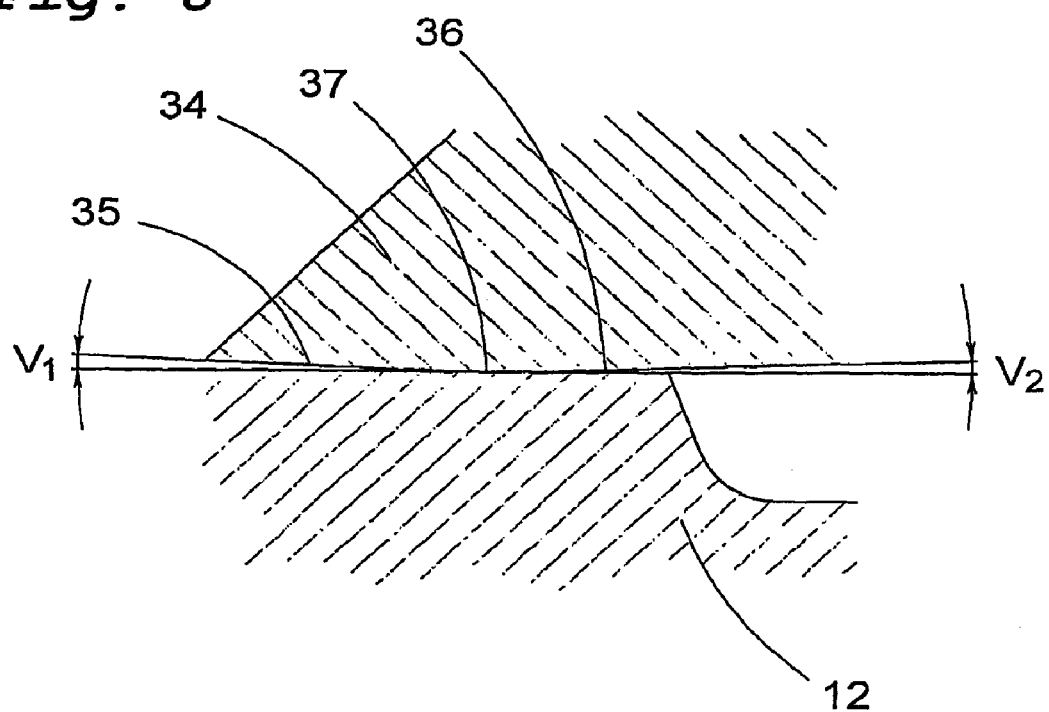

According to one embodiment, the bottom side of the front portion of the clamp 30 is formed so that the same becomes slightly curved, or composed of a number of plane surface segments 35, 36, 37, as is shown in FIG. 8, which mutually form an angle of 1–4°. Preferably, the angles $V_1$ and $V_2$ are equally large, approx. 2°. In this way, the plane surface contact becomes limited to a more distinct plane portion 37 and the requirements of absolute flatness and the maintenance of close tolerances regarding absolute flatness of the bottom side of the clamp portion 34 and plateau surface 12a in its entirety, respectively, no longer need to be critical in any way.

The rear part 38 of the clamp 30 intended for contact with the holder 10 has a plane bottom surface 39 for plane surface abutment against a corresponding plane surface 40 of the holder 10. This plane surface 40 should be plane-parallel to the upper cutting plateau 12a. At the same time, the bottom side of the clamp 30 should have a smoothly rounded transition surface 41, which in the forward direction transforms into a plane surface 42, the front portion 42 of which is intended to abut against the cutting plateau 12a.

The invention claimed is:

1. A turning comprising:
   a holder including an insert seat having a base surface and a lateral support surface structure upstanding from the base surface;
   a turning insert having a top side, an underside, and a flank surface interconnecting the top side and the underside, a blind hole formed in the underside, the underside resting upon the base surface, and the flank surface engaging the upright support surface structure,
   a support pin disposed in the holder and including first and second arms arranged generally in an L-shape, the first arm extending upwardly into the blind hole, the second arm including an end located remotely from the first arm and including two wedge-shaped portions forming therebetween a V-shaped cavity;
   a pressure-generating member arranged in the holder and including a recessed waist portion received in the cavity for permitting the pressure generating member to rotate relative to the support pin, the pressure generating member arranged wherein rotation thereof displaces the end of the second arm and causes the pin to pivot in a direction wherein the first arm presses the flank surface of the insert laterally against the lateral support surface structure.

2. The cutting tool according to claim 1 wherein the length of the blind hole is from 40–60% of a maximum thickness of the insert.

3. The cutting tool according to claim 1 wherein the top side of the insert includes a central elevated plateau spaced upwardly from a cutting edge of the insert, a height of the plateau being from 15–40% of a maximum thickness of the insert.

4. The cutting tool according to claim 3 wherein the height of the plateau is from 20–30% of the maximum thickness of the insert.

5. The cutting tool according to claim 1 wherein each of the wedge-shaped portions is beveled at its upper and lower sides.

6. The cutting tool according to claim 1 wherein an upper side of each wedge-shaped portion is obliquely inclined, and engages an obliquely inclined upper surface of the recessed waist portion.

7. The cutting tool according to claim 1 wherein the pressure generating member comprises a screw threadedly attached to the holder.

8. The cutting tool according to claim 7 wherein the screw is movable along its center axis in response to being rotated, the axis being substantially parallel to the blind hole.

9. The cutting tool according to claim 1 wherein the first arm is arranged to exert a force urging the underside of the insert against the base surface, in response to the pivoting of the pin.

10. The cutting tool according to claim 1 further including a clamp attached to the holder and including a front portion bearing against the top surface of the insert to press the insert against the base surface.

11. The cutting tool according to claim 10 wherein an underside of the front portion of the clamp is formed by a plurality of plane surface segments arranged at an angle of from 1–4° relative to one another, one of the plane surface segments arranged to bear against a raised center plateau of the insert.

12. A cutting tool comprising:
   a holder including an insert seat having a base surface, and a lateral support surface structure upstanding from the base surface;
   a turning insert mounted on the holder and including a top side, an underside disposed opposite the top side, and a flank surface interconnecting the top side and the underside; the top side including a central elevated plateau spaced upwardly from a cutting edge of the insert; the underside resting upon the base surface; a central blind hole formed in the underside, the blind hole having a length in the range of 40–60% of a maximum thickness of the insert, a closed end of the blind hole being spaced below the plateau, the plateau having a height in the range of 15–40% of the maximum thickness of the insert;

a support pin disposed in the holder beneath the insert, the support pin including first and second arms, the first arm extending upwardly into the blind hole, the second arm including an end located remote from the first arm and including two wedge-shaped portions forming therebetween a V-shaped cavity;

a pressure-generating screw arranged in the holder for adjustment relative to the holder, the pressure-generating screw including a recessed waist portion received in the cavity for causing the pin to pivot in a direction wherein the first arm forces the flank surface of the insert against the lateral support structure, in response to rotation of the screw.

13. The cutting tool according to claim 12 wherein the height of the plateau is from 20–30% of the maximum thickness of the insert.

* * * * *